US005811898A

United States Patent [19]

Everingham

[11] Patent Number: 5,811,898

[45] Date of Patent: Sep. 22, 1998

[54] ROTARY ACTUATOR

[75] Inventor: Gary M. Everingham, Chatham, Canada

[73] Assignee: Siemens Electric Limited, Mississauga, Canada

[21] Appl. No.: 576,533

[22] Filed: Dec. 21, 1995

[51] Int. Cl.[6] .......... H02K 1/06

[52] U.S. Cl. .......... 310/36; 310/257

[58] Field of Search .......... 310/36, 164, 166, 310/162, 49 R, 254, 257

[56] References Cited

U.S. PATENT DOCUMENTS

| | | | |
|---|---|---|---|
| 928,516 | 7/1909 | Hellmund . | |
| 1,852,232 | 7/1932 | Buchhold | 310/36 |
| 2,767,357 | 9/1956 | Naybor | 317/197 |
| 3,221,191 | 11/1965 | Cuches et al. | 310/36 |
| 3,746,900 | 7/1973 | Morley | 310/41 |
| 4,227,164 | 10/1980 | Kitahara | 335/220 |
| 4,287,457 | 9/1981 | Takemura | 318/133 |
| 4,345,228 | 8/1982 | Idogaki et al. | 335/222 |
| 4,577,832 | 3/1986 | Sogabe | 251/129 |
| 4,672,247 | 6/1987 | Madsen et al. | 310/49 R |
| 4,691,135 | 9/1987 | Sogabe et al. | 310/254 |
| 4,825,840 | 5/1989 | Hewette et al. | 123/571 |
| 4,848,652 | 7/1989 | Kennedy | 236/34.5 |
| 4,899,073 | 2/1990 | Takeuchi et al. | 310/116 |
| 4,915,083 | 4/1990 | Hewette et al. | 123/571 |
| 4,969,628 | 11/1990 | Reich et al. | 251/122 |
| 4,972,109 | 11/1990 | Kakizaki et al. | 310/49 R |
| 5,073,735 | 12/1991 | Takagi | 310/71 |
| 5,121,017 | 6/1992 | Yamamoto et al. | 310/49 R |
| 5,160,115 | 11/1992 | Ito et al. | 251/129.12 |
| 5,211,670 | 5/1993 | Ohmi et al. | 29/598 |
| 5,266,858 | 11/1993 | Ohmi et al. | 310/208 |
| 5,283,487 | 2/1994 | Oki et al. | 310/49 R |
| 5,283,495 | 2/1994 | Wendel et al. | 310/257 |
| 5,327,035 | 7/1994 | Sunaga | 310/81 |

FOREIGN PATENT DOCUMENTS

| | | | |
|---|---|---|---|
| 0 342 733 A2 | 5/1989 | European Pat. Off. . | |
| 1102263 | 3/1961 | Germany | 310/49 R |
| 44 09 503 A | 9/1994 | Germany . | |
| 1 000 838 | 4/1962 | United Kingdom . | |

*Primary Examiner*—Steven L. Stephan
*Assistant Examiner*—Michael J. Wallace, Jr.

[57] ABSTRACT

A rotary actuator has a ferromagnetic armature with at least one arcuate-shaped wall extending circumferentially at the perimeter of the armature. The stator has a pair of axially and circumferentially aligned axial walls, separated by an axial air gap, disposed radially outward of, and in relatively circumferentially advanced relationship to, each such arcuate-shaped wall. Current flow in an electromagnetic coil associated with the stator causes magnetic flux to pass from one axial wall of each pair, across an air gap, to the respective arcuate-shaped armature wall, through that wall, and across a radial air gap to the other axial wall of each pair. Each arcuate-shaped wall has a ferromagnetic characteristic that causes it to be positioned to increasingly circumferentially overlap the respective pair of axial walls as the magnetic flux increases. The actuator may include a rotary flow control valve, such as an EGR valve for an automotive engine.

20 Claims, 3 Drawing Sheets

ROTARY ACTUATOR

FIELD OF THE INVENTION

This invention relates to a rotary actuator, particularly one that is a electromagnetically operated. The inventive actuator is especially useful for control of the operation of a flow control device, such as a rotary valve, for example an exhaust gas recirculation (EGR) valve for an automotive vehicle internal combustion engine.

BACKGROUND AND SUMMARY OF THE INVENTION

Controlled engine exhaust gas recirculation is one technique that is used for reducing oxides of nitrogen in products of combustion that are exhausted from an internal combustion engine to atmosphere. One type of EGR system comprises an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

Exhaust emission requirements have been imposing increasingly stringent demands on tailpipe emissions that may be met by improved control of EGR valves. An electromagnetically operated actuator is one device for obtaining improved EGR valve control, but to be commercially suitable, such an actuator must be able to operate properly for an extended period of usage in a harsh operating environment that includes wide temperature extremes and vibrations. Moreover, in mass-production automotive vehicle applications, component cost-effectiveness is an important consideration. A rotary type actuator, which may include a butterfly or a ball valve for example, may offer certain cost-effectiveness as an EGR valve. Such a valve, if controlled by a rotary electromagnetic actuator that is cost-effective and provides desired operational characteristics for control of the valve, would provide a desirable product for automotive usage.

The present invention relates to a new and unique electromagnetic rotary actuator that is capable of compliance with the demanding requirements for automotive applications. While the inventive principles encompass the actuator's control of a rotary EGR valve, the broader principles are more generic. It is anticipated that the inventive actuator may have application to various other rotary actuated devices. In conjunction with an EGR valve however, the inventive actuator provides a capability for conveniently establishing a desired response characteristic for a particular engine. Because of this capability, such an actuator can be adapted to meet particular response characteristics for various engines.

Generally speaking, the invention relates to a novel stator-armature structure that provides for selective rotary positioning of the armature in accordance with an electric current input to an electromagnetic coil that creates a magnetic flux that interacts between the stator and armature to position the armature. In an internal combustion engine EGR system, the engine's electronic control unit provides the control current for the electromagnetic coil.

Further features, advantages, and benefits of the invention will be seen in the ensuing description and claims that are accompanied by drawings. The drawings disclose a presently preferred embodiment of the invention according to the best mode contemplated at this time for carrying out the invention.

DESCRIPTION OF THE PREFERRED EMBODIMENT

FIGS. 1–7 disclose a rotary actuator 10 embodying principles of the present invention. Actuator 10 comprises an armature 12 and a stator 14 having a common longitudinal axis 16.

Figure 1:
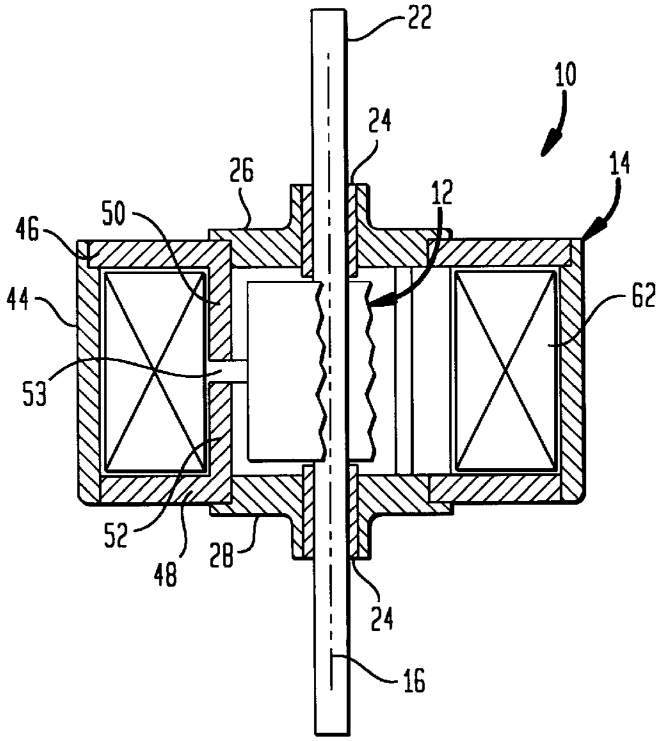
FIG. 1 is a longitudinal cross section view having a portion broken away through an actuator embodying principles of the invention.
Figure 2:
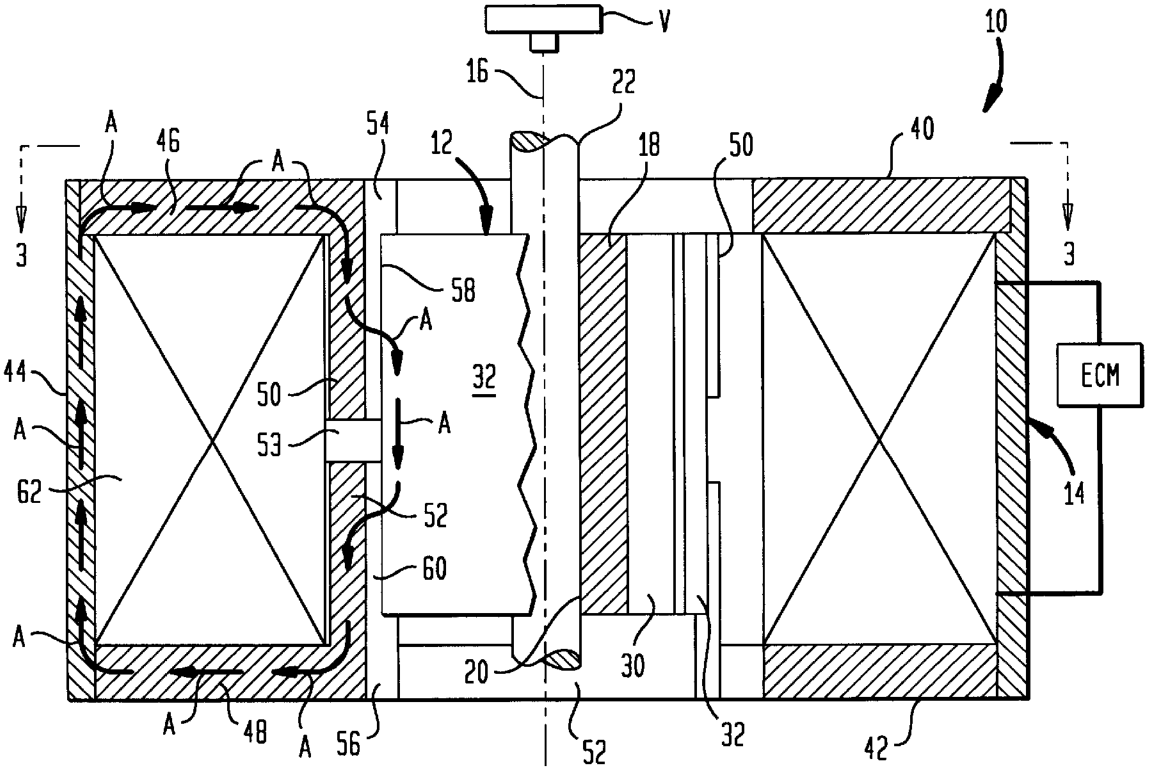
FIG. 2 is an enlarged view of certain portions of FIG. 1 to show greater detail.
Figure 3:
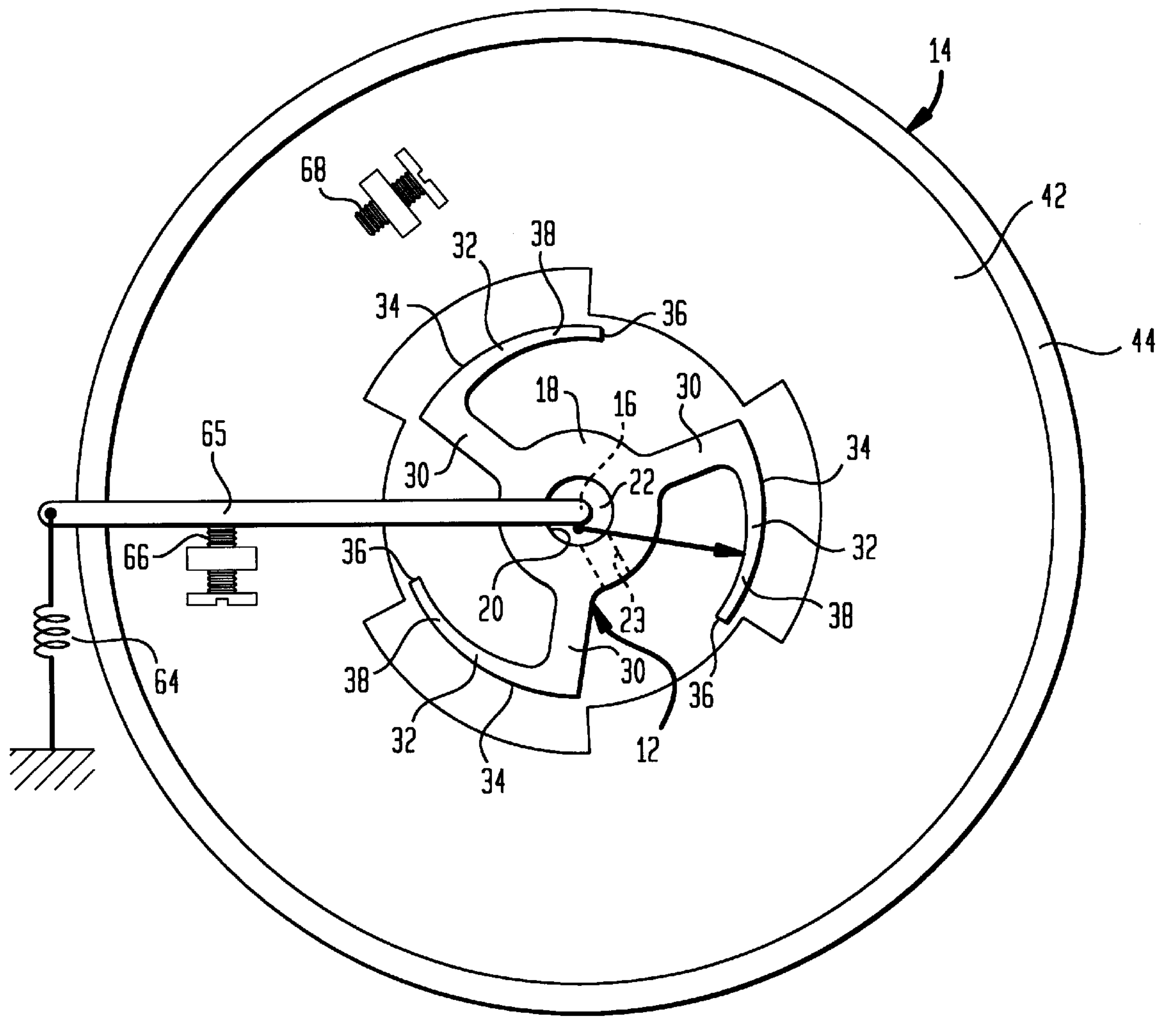
FIG. 3 is a full top view in the direction of arrows 3—3 in FIG. 2, including further detail.
Figure 7:
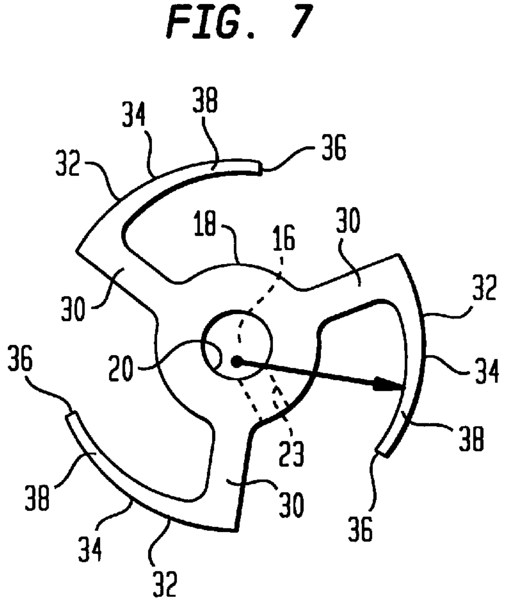
FIG. 7 is an axial end view of still another part of the actuator by itself, namely an armature.

Armature 12 comprises a central cylindrical core 18 having a through-hole 20 that is concentric with axis 16 (see FIGS. 2, 3, and 7 in particular). A shaft 22 (see FIGS. 1, 2, and 3) passes through through-hole 20, and the two are secured together in any suitable fashion, such as by a set screw that is threaded into a tapped radial hole 23 in the wall of core 18 to forcefully abut the O.D. of shaft 22.

Opposite axial end portions of shaft 22 are journaled via respective bushings 24 in respective annular non-magnetic bearing members 26, 28 that are concentrically mounted on opposite axial end portions of stator 14.

Extending radially outward from central core 18 in a symmetrical pattern about the armature axis are three radial supporting walls 30. A generally arcuate-shaped wall 32 extends circumferentially from the radially outer end of each respective supporting wall 30. Core 18, walls 30, and walls 32 are a single ferromagnetic part, such as cold rolled steel, or powdered metal, or laminate. Each wall 32 is identical to the other walls 32 and has an axial expanse parallel with longitudinal axis 16, a circumferential expanse about longitudinal axis 16, and a radial expanse radial to longitudinal axis 16. Each wall 32 constitutes a ferromagnetic member that, as will be more fully explained hereinafter, is acted upon by magnetic flux to selectively position armature 12 about axis 16.

Each such ferromagnetic member 32 comprises a radially outer wall surface 34 whose circumferential and axial expanses lie on a portion of a surface of a respective imaginary cylindrical surface that is coaxial with longitudinal axis 16. Each ferromagnetic member's circumferential expanse extends from a leading end 36 along an immediately trailing portion 38. The leading ends 36 point in a direction of advancing rotary positioning of the armature from the position illustrated in FIG. 3. The armature position shown in FIG. 3 is an initial position from which the armature is advanced (clockwise in FIG. 3) as a function of magnetic flux acting on members 32.

Stator 14 comprises first, second, and third ferromagnetic stator members 40, 42, and 44 respectively. Each member 40, 42 comprises a respective circular flange 46, 48 at one axial end, and a respective set of three axial walls 50, 52 respectively, that are arranged symmetrically about the stator and are of identical axial, circumferential, and radial expanses. Each flange 46, 48 has a respective through-hole 46A, 48A which is circularly concentric with axis 16 except at the locations of the respective axial wall 50, 52. The axial walls 50, 52 of each member 40, 42 extend from the inner margin of its respective through-hole 46A, 46B so that each respective flange 46, 48 extends radially outward from its axial wall 50, 52.

Each axial wall 50 of member 40 is in circumferential and radial alignment with, but axially spaced from, a respective axial wall 52 of the other member 42. The axial spacing that is provided between each pair of respective circumferentially and radially aligned walls 50, 52 provides an axial air gap 53 that is of a relatively high magnetic reluctance in comparison to the relatively low magnetic reluctance of the ferromagnetic material constituting members 40, 42.

Figure 4:
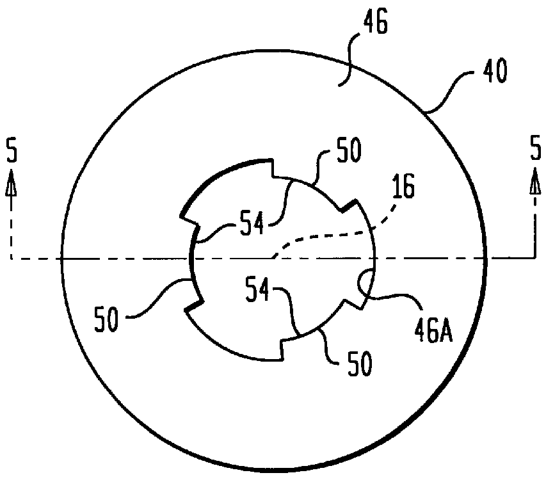
FIG. 4 is a top axial end view of one part of the actuator by itself, namely an upper stator member.
Figure 5:
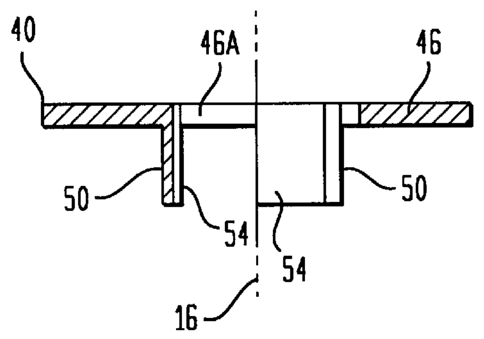
FIG. 5 is a transverse cross section view in the direction of arrows 5—5 in FIG. 4.
Figure 6:
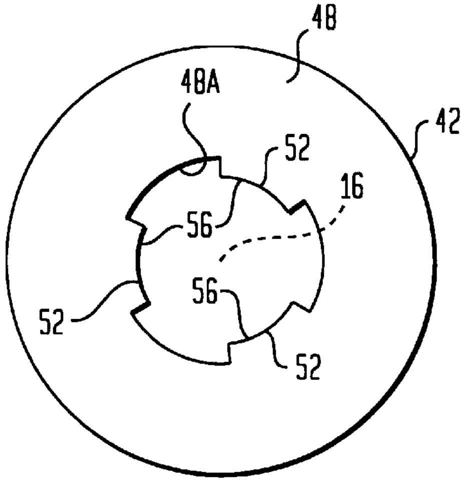
FIG. 6 is a bottom axial end view of another part of the actuator by itself, namely a lower stator member.

Each of the three axial walls 50 of member 40, as show by FIGS. 4 and 5 comprises a respective radially inner wall surface 54 whose circumferential and axial expanses lie on a portion of a respective imaginary cylindrical surface coaxial with longitudinal axis 16. The axial walls 50 bound a circular space for locating member 26 concentric with axis 16 as show by FIG. 1. Likewise, as show in FIG. 5 each of the three axial walls 52 of each member 42 comprises a respective radially inner wall surface 56 whose circumferential and axial expanses lie on a portion of a respective imaginary cylindrical surface coaxial with longitudinal axis 16. The axial walls 52 bound a circular space for locating member 28 concentric with axis 16, as shown by FIG. 1.

Thus, each stator member 40, 42 may be described alternatively as comprising a respective circular annular disc that corresponds to its respective flange 46, 48, and three respective teeth, corresponding to its three respective axial walls 50, 52. Each such disc is disposed perpendicular to axis 16, and such teeth extend axially parallel to axis 16 from the inner periphery of the respective disc. The three teeth of each member 40, 42 are identical, presenting a circularly concave surface inner surface toward axis 16, and having identical circumferential extent and uniform radial thickness. The teeth of each member are circumferentially uniformly spaced apart, and those of one member register in alignment with those of the other with an intervening air gap disposed axially between the registered teeth.

Member 44 is cylindrical in shape and extends axially parallel to axis 16. Its axial ends and the radially outer perimeters of members 40, 42 are shaped for fitting together so that as viewed in cross section passing through each pair of aligned walls 50, 52 as in FIG. 3, members 40, 42, and 44 provide a low reluctance path that forms a portion of a magnetic circuit represented by the small arrows A. The relatively high reluctance provided by proper axial dimensioning of each air gap 53 presents an impedance to flux attempting to pass directly across the air gap. A radial air gap provided by the radial distance 58 between armature surface 34 and surfaces 54 of stator member 40, a radial air gap provided by the radial distance 60 between armature surface 34 and surfaces 54 of stator member 42, and the reluctance of each member 32, together, provide a considerably lower reluctance than that of air gap 53 between the confronting ends of each pair of aligned walls 50, 52, such that a predominance of magnetic flux passes from one of the walls 42, 52 across the corresponding radial air gap 58, 60 to the respective member 32, is conducted through the respective member 32, and passes back across the other radial air gap 58, 60 to the other of the walls 42, 52.

An electromagnetic coil 62 is disposed coaxially with axis 16 and occupies the space that extends axially between flanges 46, 48 and radially between walls 50, 52 and member 44. As electric current is increasingly delivered to coil 62, increasing magnetic flux is developed in the direction of arrows A. In the initial position of the armature the leading limit 36 of each member 32 and the trailing limit of a respective pair of walls 50, 52 are in mutual juxtaposition. As the magnetic flux progressively increases, an increasing force is exerted on each member 32 to increasingly advance the armature about axis 16. As the armature advances, the extent to which each member 32 circumferentially overlaps the corresponding pair of walls 50, 52 progressively increases. The functional relationship between magnetic flux and the position assumed by armature 12 is established by the ferromagnetic characteristic of each member 32 that extends from its leading end 36 along its trailing portion 38 and the radial air gaps 58, 60. If the ferromagnetic material is of uniform magnetic permeability, the characteristic can be established by the radial thickness of each member 32 along the circumferential extent of its trailing portion 38. In the initial position of the armature as herein defined, the radially outer ends of supporting walls 30, which like members 32 are also ferromagnetic in the disclosed embodiment, should be sufficiently spaced from the immediately trailing axial walls 50, 52 to avoid creating any significant flux path that would tend to oppose the advancement of armature 12. It is to be observed that while each air gap 53 is axially overlapped by the respective member 32, the member 32 is shorter in overall axial length than are the combined lengths of wall 50, air gap 53, and wall 52. The armature is axially disposed relative to the stator so that the flux passing between it and the stator passes across the air gaps 58 and 60 between it and the walls 50, 52.

FIG. 3 shows that the magnetic force acting to advance the armature is opposed by a spring 64, one end of which is anchored and the other end of which is connected to a radial arm 65 extending from shaft 22, so that the armature will be advanced until the spring force balances the magnetic force. A range of positioning of the armature is established by a pair of stops 66, 68 which are shown to be adjustable to set the precise limits of positioning, and the range of positioning thus established serves to keep each member 32 associated with its respective pair of axial walls 50 and 52.

The illustrated embodiment has been disclosed to comprise three walls 32, and their supporting walls 30, which are symmetrically arranged. Embodiments having a different number of walls 32 and/or having some degree of asymmetry are contemplated within the scope of this invention, although symmetrical embodiments are apt be preferred.

FIG. 2 also shows somewhat schematically the inventive actuator 10 having shaft 22 controlling the positioning of an automotive engine EGR valve V, and coil 62 receiving electric current from an engine electronic control module ECM.

While a presently preferred embodiment of the invention has been illustrated and described, it should be appreciated that other constructions and embodiments may fall within the scope of the following claims.

What is claimed is:

1. A rotary actuator comprising:

an armature;

means mounting said armature for rotary positioning about a longitudinal axis from an initial position over a range of positions that are advanced from the initial position in one circumferential direction;

said armature comprising a ferromagnetic member disposed radially outward of the longitudinal axis;

said member having an axial expanse parallel with the longitudinal axis, a circumferential expanse about the longitudinal axis, and a radial expanse radial to the longitudinal axis;

a magnetic flux source for providing various intensities of magnetic flux over a range of different flux intensities;

a stator forming a portion of a magnetic circuit for conducting magnetic flux created by said magnetic flux source;

said stator comprising axial wall means disposed radially outward of said armature via a radial air gap, said axial wall means having an axial expanse parallel with the longitudinal axis, a circumferential expanse about the longitudinal axis, and a radial expanse radial to the longitudinal axis;

said axial wall means comprising first and second, axially spaced apart, relatively low magnetic reluctance wall portions that form respective portions of the magnetic circuit and are axially separated by a relatively high magnetic reluctance that is proximate a portion of the axial expanse of said ferromagnetic member for causing a predominance of magnetic flux passing through said first of said axially spaced apart wall portions of said axial wall means to pass across said radial air gap to said ferromagnetic member, to be conducted through said ferromagnetic member, and to pass back across said radial air gap to said second of said axially spaced apart wall portions of said axial wall means;

said axial wall means, when said armature is in the initial position, having its circumferential expanse disposed circumferentially advanced in the one circumferential direction relative to the circumferential expanse of said ferromagnetic member each of said first and said second wall portions of said axial wall means comprising a respective radially inwardly directed projection having a radially inner wall surface whose circumferential and axial expanses lie on a portion of a respective imaginary cylindrical surface coaxial with said axis and defining the radially outer boundary of said radial air gap;

said ferromagnetic member comprising a radially outer wall surface whose circumferential and axial expanses lie on a portion of a surface of a respective imaginary cylindrical surface coaxial with said axis and defining the radially inner boundary of said radial air gap;

said ferromagnetic member's circumferential expanse comprising a leading end that is disposed circumferentially relative to an immediately trailing portion of said ferromagnetic member's circumferential expanse in the one direction;

said axial wall means' circumferential expanse comprising a trailing end that is disposed circumferentially relative to an immediately leading portion of its circumferential expanse in a direction opposite the one direction;

said leading end of said ferromagnetic member and said trailing end of said axial wall means being in mutual juxtaposition when said armature is in the initial position;

said immediately trailing portion of said ferromagnetic member comprising a ferromagnetic characteristic that causes said armature to advance from the initial position in the one direction in an amount that bears a predetermined relationship to the magnetic flux in said magnetic circuit; and a biasing element that exerts a force on said armature which biases said armature toward the initial position, and that increases said force on said armature as said armature is increasingly advanced in the one direction from the initial position.

2. A rotary actuator as set forth in claim 1 in which said ferromagnetic characteristic comprises a radial dimensional characteristic.

3. A rotary actuator as set forth in claim 2 in which said radial dimensional characteristic comprises a progressively increasing radial dimension in a direction away from said leading end of said member.

4. A rotary actuator as set forth in claim 1 in which the overall axial expanse of said axial wall means exceeds that of said ferromagnetic member, and the axial expanse of said ferromagnetic member is axially offset relative to the axial expanse of said axial wall means, but axially overlaps said relatively high magnetic reluctance that axially separates said first and second, axially spaced apart, relatively low magnetic reluctance portions wall of the magnetic circuit.

5. A rotary actuator as set forth in claim 4 in which said first relatively low magnetic reluctance wall portion comprises a first ferromagnetic stator member that also has a radially outwardly directed flange at an end of its axial expanse that is axially opposite said relatively high reluctance, said second relatively low magnetic reluctance wall portion comprises a second ferromagnetic stator member that also has a radially outwardly directed flange at an end of its axial expanse that is axially opposite said relatively high reluctance, and said relatively high reluctance comprises an axial air gap separating said first and second wall portions.

6. A rotary actuator as set forth in claim 5 in which said stator further comprises a third ferromagnetic stator member that has an axial expanse extending between radially outer ends of said flanges, and further including an electromagnetic coil disposed coaxially with the longitudinal axis radially outward of said axial wall means, axially between said flanges, and radially inward of said third ferromagnetic stator member.

7. A rotary actuator as set forth in claim 1 in which said armature comprises a one-piece member containing said ferromagnetic member, a central cylindrical core, and a radial wall extending radially outward from said central cylindrical core to a trailing end of said ferromagnetic member's circumferential expanse.

8. A rotary actuator as set forth in claim 7 in which said armature's central cylindrical core comprises an axial through-hole concentric with the longitudinal axis, and further including a shaft extending through said through-hole and means for securing said shaft and said central core together, and in which said means mounting said armature for rotary positioning about the longitudinal axis comprises journal means journaling said shaft.

9. A rotary actuator as set forth in claim 1 in which said actuator comprises a plurality of said ferromagnetic members symmetrically disposed on said stator, and said stator comprises a plurality of said axial wall means symmetrically disposed on said stator, each said ferromagnetic member and a respective one of said axial wall means being constructed and arranged relative to each other as recited in claim 1.

10. A rotary actuator as set forth in claim 9 in which each of said ferromagnetic members has the same axial expanse, the same radial expanse, and the same circumferential expanse, and each of said axial wall means has the same axial expanse, the same radial expanse, and the same circumferential expanse.

11. A rotary actuator as set forth in claim 9 in which said ferromagnetic characteristic of each said ferromagnetic member comprises a respective radial dimensional characteristic.

12. A rotary actuator as set forth in claim 9 in which the axial expanse of each said axial wall means exceeds that of the respective ferromagnetic member, and the axial expanse of each said ferromagnetic members is axially offset relative to the axial expanse of the respective axial wall means but axially overlaps the respective relatively high magnetic reluctance that axially separates the respective first and second, axially spaced apart, relatively low magnetic reluctance wall portions of the respective axial wall means.

13. A rotary actuator as set forth in claim 12 in which the first relatively low magnetic reluctance wall portion of each respective axial wall means comprises a first ferromagnetic stator member that also has a radially outwardly directed flange at an end of its axial expanse that is axially opposite the respective relatively high reluctance, the second relatively low magnetic reluctance wall portion of each respective axial wall means comprises a second ferromagnetic stator member that also has a radially outwardly directed flange at an end of its axial expanse that is axially opposite the respective relatively high reluctance, and each said relatively high reluctance comprises an axial air gap separating the respective first and second wall portions of said respective axial wall means.

14. A rotary actuator as set forth in claim 13 in which said stator further comprises further ferromagnetic stator members, each of which has an axial expanse extending between radially outer ends of respective ones of said flanges of the respective first and second ferromagnetic stator members, and further including an electromagnetic coil disposed coaxial with the longitudinal axis, radially outward of said plurality of axial wall means, axially between respective ones of said flanges of said first and second ferromagnetic stator members, and radially inward of said further ferromagnetic stator members.

15. A rotary actuator as set forth in claim 1 further including a rotary valve that is operatively coupled with said armature for controlling a fluid flow in accordance with the rotary positioning of said armature.

16. A rotary actuator as set forth in claim 15 in which said rotary valve is an automotive engine EGR valve.

17. A rotary actuator as set forth in claim 1 including a stop that defines the initial position of said armature, and said biasing element comprises spring resiliently biasing said armature against said stop in the absence of magnetic flux from said magnetic flux source.

18. A rotary actuator as set forth in claim 17 in which said stop comprises adjustment means for setting the initial position of said armature.

19. A rotary actuator as set forth in claim 17 including a further stop that defines the maximum position away from the initial position to which said armature may be advanced by magnetic flux from said magnetic flux source.

20. A rotary actuator comprising:

an armature;

means mounting said armature for rotary positioning about a longitudinal axis from an initial position over a range of positions that are advanced from the initial position in one circumferential direction;

said armature comprising a ferromagnetic member disposed radially outward of the longitudinal axis;

said member having an axial expanse parallel with the longitudinal axis, a circumferential expanse about the longitudinal axis, and a radial expanse radial to the longitudinal axis;

a magnetic flux source for providing various intensities of magnetic flux over a range of different flux intensities;

a stator forming a portion of a magnetic circuit for conducting magnetic flux created by said magnetic flux source;

said stator comprising axial wall means disposed radially outward of said armature via a radial air gap, said axial wall means having an axial expanse parallel with the longitudinal axis, a circumferential expanse about the longitudinal axis, and a radial expanse radial to the longitudinal axis;

said axial wall means comprising first and second, axially spaced apart, relatively low magnetic reluctance wall portions that form respective portions of the magnetic circuit and are axially separated by a relatively high magnetic reluctance that is proximate a portion of the axial expanse of said ferromagnetic member for causing a predominance of magnetic flux passing through said first of said axially spaced apart wall portions of said axial wall means to pass across said radial air gag to said ferromagnetic member, to be conducted through said ferromagnetic member, and to pass back across said radial air gap to said second of said axially spaced apart wall portions of said axial wall means;

said axial wall means, when said armature is in the initial position, having its circumferential expanse disposed circumferentially advanced in the one circumferential direction relative to the circumferential expanse of said ferromagnetic member;

each of said first and said second wall portions of said axial wall means comprising a respective radially inwardly directed projection having a radially inner wall surface whose circumferential and axial expanses lie on a portion of a respective imaginary cylindrical surface coaxial with said axis and defining the radially outer boundary of said radial air gap;

said ferromagnetic member comprising a radially outer wall surface whose circumferential and axial expanses lie on a portion of a surface of a respective imaginary cylindrical surface coaxial with said axis and defining the radially inner boundary of said radial air gap;

said ferromagnetic member's circumferential expanse comprising a leading end that is disposed circumferentially relative to an immediately trailing portion of said ferromagnetic member's circumferential expanse in the one direction;

said axial wall means' circumferential expanse comprising a trailing end that is disposed circumferentially relative to an immediately leading portion of its circumferential expanse in a direction opposite the one direction;

said leading end of said ferromagnetic member and said trailing end of said axial wall means being in mutual juxtaposition when said armature is in the initial position;

said immediately trailing portion of said ferromagnetic member comprising a ferromagnetic characteristic that causes said armature to advance from the initial position in the one direction; and a bias member that opposes rotary positioning of said armature in the one direction.

* * * * *